Feb. 15, 1944.  W. E. MILLER  2,341,939
TRACTOR TRAILER
Filed Dec. 17, 1942  2 Sheets-Sheet 1
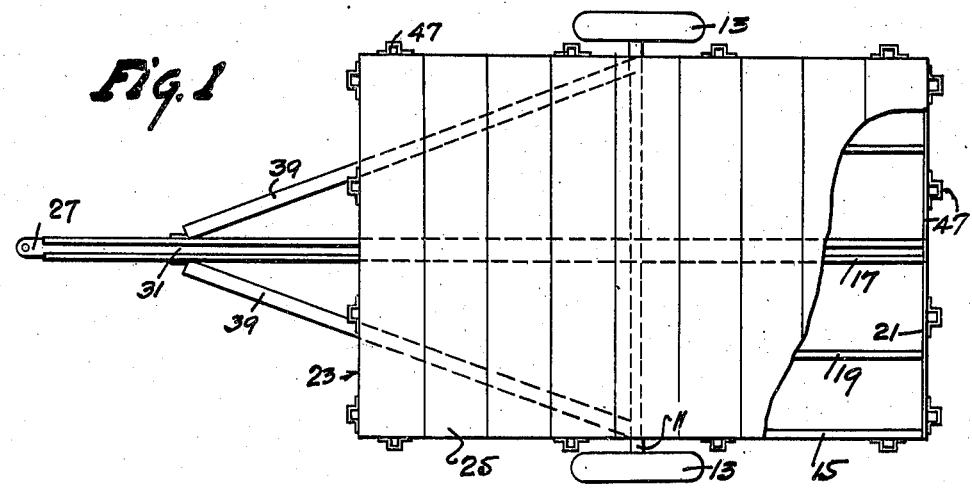
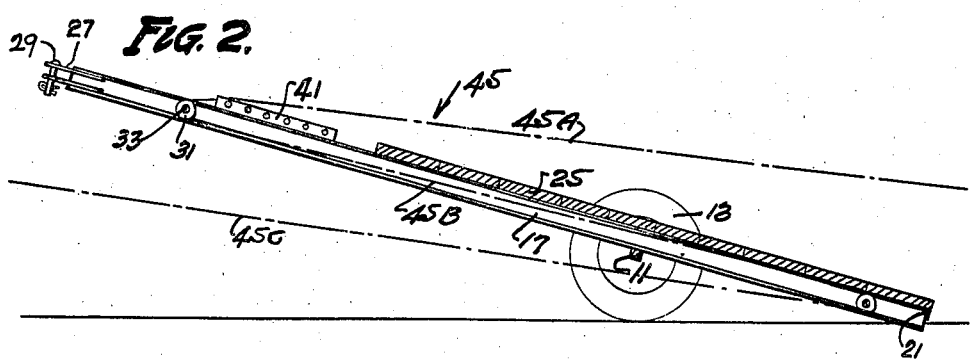
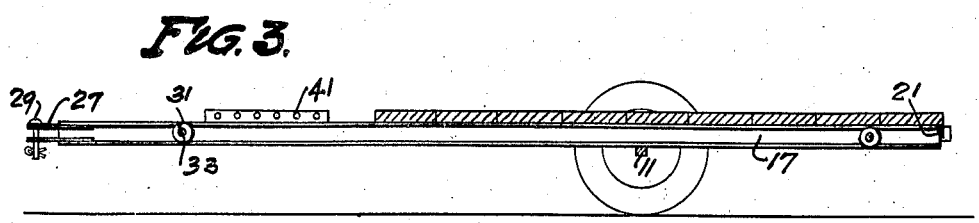
INVENTOR.
WILLIAM E. MILLER.
BY J. H. Weatherford Feb. 15, 1944.    W. E. MILLER    2,341,939
TRACTOR TRAILER
Filed Dec. 17, 1942    2 Sheets-Sheet 2
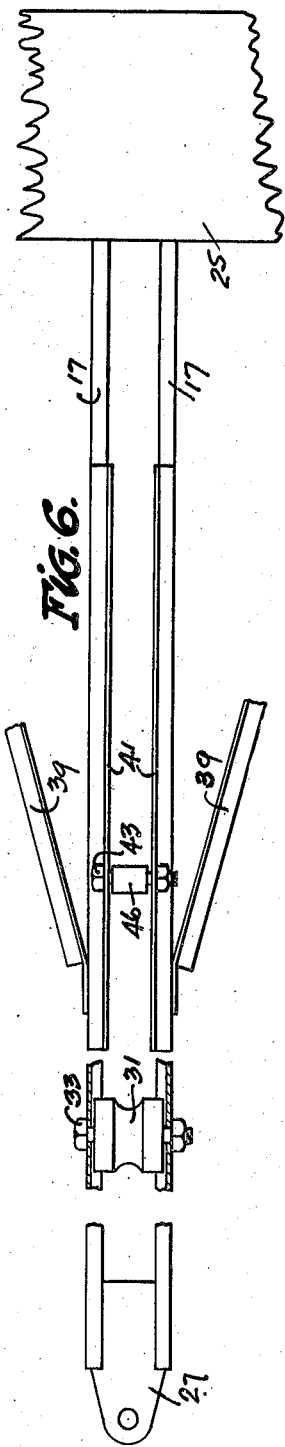
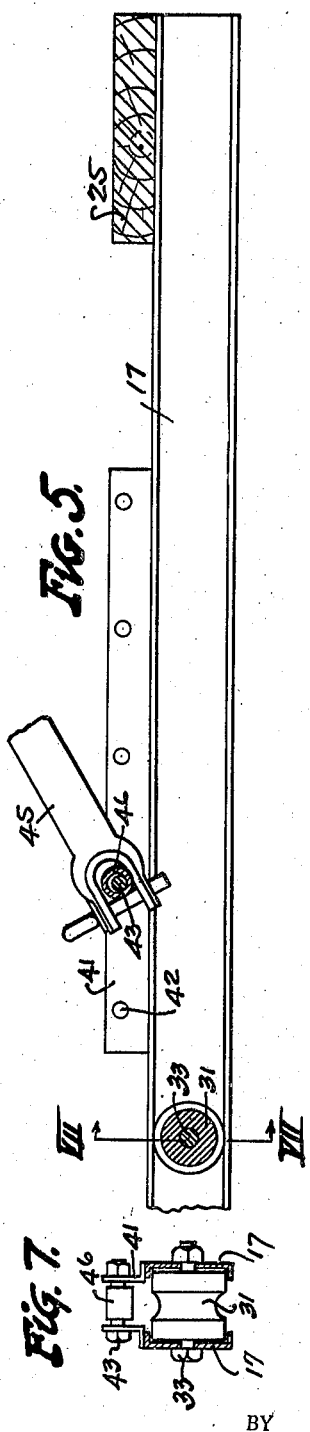
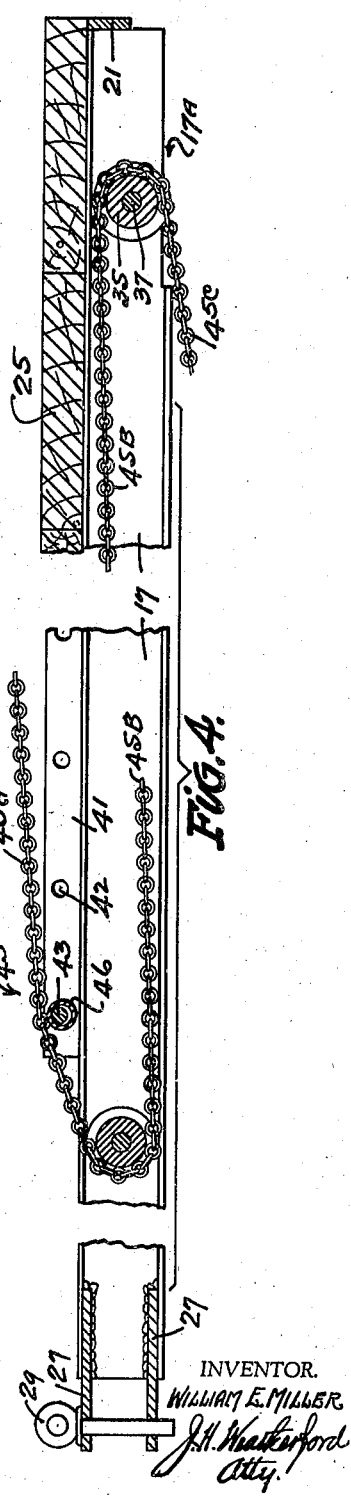
INVENTOR.
WILLIAM E. MILLER
BY J. H. Weatherford
Atty.

Patented Feb. 15, 1944

2,341,939

UNITED STATES PATENT OFFICE 2,341,939

TRACTOR TRAILER

William E. Miller, Kerrville, Tenn.

Application December 17, 1942, Serial No. 469,285

4 Claims. (Cl. 214—65)

This invention relates to improvements in trailers of platform type which are equipped for coupling to the rear of a wheeled vehicle which, while it may be animal drawn, is preferably a tractor, and which trailers are preferably adapted to have their forward ends supported by such vehicle when so coupled, and are particularly characterized by being readily detachable from the tractor or other traction means and by a construction which permits the use of the detached traction means for accomplishing the loading of the trailer.

Particularly in farm work, implements of various types, such as disk harrows, or other traction drawn implements, logs and many other articles too bulky and heavy for ready loading must or should be loaded on a wheel carrier for transfer from point to point if damage to intervening field or roads is to be prevented, and even where traction power alone is readily available for such loading, as well as the subsequent transfer, there is usually a dearth of equipment for accomplishing such loading.

The objects of the present invention are:

To provide a device of simple and rugged type which may be readily coupled to traction means for accomplishing transfer, and which is so constructed that while coupled to the traction means it may readily be shifted into adjacency to the article to be loaded, and may be disconnected therefrom and the traction means used in connection with the construction and equipment provided in the trailer, to accomplish the loading and anchorage of the load which is to be moved.

The means by which the foregoing and other objects are accomplished and the method of their accomplishment will readily be understood from the following specification upon reference to the accompanying drawings, in which:

Fig. 1 is a plan view of the trailer.

Fig. 2 is a sectional side elevation of the trailer in position to be loaded with an alinement of the loading cable under loading strain indicated.

Fig. 3 is a similar sectional side elevation of the trailer leveled up as if connected to the traction means.

Figs. 4, 5, 6, and 7 are views on an enlarged scale.

Fig. 4 is a sectional side elevation taken as on the center line of fragmentary portions of the front and rear ends of the trailer showing details of such front and rear end portions.

Fig. 5 is a similar fragmentary sectional elevation showing utilization of the load anchor, the loading chain being omitted.

Fig. 6 is a fragmentary plan showing the front end of the tongue beam with the loading chain omitted; and Fig. 7 is a sectional elevation of the tongue beam taken on the line VII—VII of Fig. 5.

Referring now to the drawings in which the various parts are indicated by numerals:

The trailer comprises a transverse axle 11 on opposite ends of which are mounted wheels 13, 13. Resting directly on this axle are longitudinallly disposed side beams 15, center beams 17 and one or more, symmetrically disposed, additional sets of longitudinal beams, one pair only, 19, 19, being here indicated. The rear ends and front ends of these beams are joined together by cross beams 21 and 23 respectively, and a floor 25 extending from side beam to side beam is supported on and secured to these beams.

The two center beams 17 are disposed in adjacency and extend forwardly beyond the front beam 23 to form a tongue. Throughout their length they are uniformly spaced to provide a channelway. At their forward ends they are joined and rigidly secured together by horizontally disposed upper and lower plates 27, which plates are apertured so as to receive a pin 29 through which coupling may be effected to the tractor or other traction means.

Rearwardly of these plates a grooved roller or pulley 31 is journalled between the two beams 17 on a transverse pin 33, the greatest diameter of the roller preferably being slightly less than the depth of the beams so that the roller is substantially housed therebetween. Intermediate their length and to their rear ends, all the beams are secured and braced by the overlying floor secured thereto, and by the underlying axle to which they are secured. Adjacent the rear end, a second grooved roller or pulley 35 is disposed between the beams 17 and journalled on a pin 37, the diameter of this roller being preferably slightly less than the depth of the beam, the diameter of the roller and the positioning of the pin being such that the top of the roller does not extend above the top of the beam. At their rear ends all the beams are additionally secured together by the transverse beam 21.

Preferably the beams forming the tongue are braced by diagonal braces 39, rigidly secured to the tongue forward of the platform. The braces extend rearwardly and diverge to the side beams 15 adjacent the axle and are rigidly secured to the beams and axle. Mounted on the tongue beams 17 and in adjacency to the forward roller 31 are a pair of upwardly extending plates 41, these plates preferably being the vertically disposed legs of angle irons which have their horizontal legs secured to the tops of the beams. These plates are apertured from time to time with alined holes optionally usable to receive a transverse anchor bolt 43 which may be shifted as occasion may demand and in which is adapted to form, in many cases, a suitable anchorage to which the traction hitch of various types of farm implements or machinery, as the hitch 45, may be conveniently secured when such machinery has been loaded on the trailer, the positioning of the bolt 43 providing convenient adjustment to balance the load properly over the axle. 46 is a sleeve around the bolt 43 reducing chain drag thereover. 45 is a chain, or cable, which is disposed lengthwise of the trailer, with the upper and rearward portion 45-A lying on the floor thereof. This chain is carried over the front roller 31, the mid portion 45-B is returned rearwardly beneath the floor and in the channelway between the beams 17, and over the rear roller 35, and the lower and forward portion 45-C returned to the front of the trailer. The chain 45 is of such length that its ends, when thus placed, extend behind the trailer sufficiently to permit its engagement with the load and forwardly to permit attachment to the traction means. When not in use the forward end of the chain may be wrapped for support around the tongue, and the rearward end coiled, or otherwise disposed, on the floor of the trailer, or as is ordinarily more convenient, after loading, may also be wrapped around the tongue.

47 are stake pockets in which may be placed stakes, not here shown, to prevent load displacement or otherwise; or as posts for sides and ends.

In the foregoing description of the trailer, it will be noted that the materials of which the trailer is made, are, as far as possible, entirely omitted, and it will be understood that the beams and floor may be made of wood, and even the axle itself may be largely of wood. Preferably, however, the axle is of metal, such as steel, and the beams are steel channels with their flanges inwardly faced on the opposite sides of the center, this construction, insofar as the tongue is concerned, effecting a hollow box-shaped structure made up of two channels with the flanges of each faced respectively toward the flanges of the opposite channel, the flanges of the two channels being spaced apart sufficiently to provide free space for the chain, the cross section of the tongue preferably being substantially square. The rollers 31 and 35 are of length to lie loosely between the webs of the channels, and their diameters such that they will extend into the channels between the flanges thereof. The floor may be either of sheet metal or of wood. If metal beams are used the bottom flanges are cut away at their rear ends, as at 17-A, so that the webs of the beams may readily cut into the ground surface at such ends during loading, and the cross beam 21 is preferably a flat bar of about half channel depth, or an angle iron having its vertical leg extending downward to effect a similar edge structure, available for embedment under loading conditions as an anchor against trailer displacement where ground conditions permit. Where embedment occurs, the floor becomes the actual support for the rear end during loading.

In use the hitch, formed by the plates 27 at the forward end of the tongue, is coupled to the traction means, as by the pin 29, and supported by the traction means. This traction means, which may be of type available, and is therefore not here shown, is used to tow the trailer into proximity to the implement or other article to be loaded, and to shift the rear end of the trailer into adjacency to the article. The traction means is disconnected from the trailer and the forward end 45-C of the chain or cable underlying the trailer, is coupled or otherwise secured to the traction means. The rear end 45-A of the chain or cable is securely attached to the implement or other article to be loaded, this being conveniently done, if the load be an implement of traction drawn type, by merely attaching the chain or cable to the traction hitch, as the hitch 45, of the implement. Pull is exerted on the forward end of the chain by the traction means. This pull, if the rear end of the trailer does not already rest on the ground, is first effective through the downward pull of the chain portion 45-C on the rear roller 35 and against the anchorage pull of the load itself through the chain portion 45-A over and around the forward roller 31, to force the rear end of the trailer against the ground and cause the rear ends of the beams 15, 17 and 19 to embed in the ground and effect anchorage particularly against backward shift of the trailer. This pull also tends to embed the cross beam 21 at the rear end of the trailer and to provide additional anchorage. Subsequent forward pull of the traction means on the cable pulls the load forward and up the inclined surface of the floor, the movement being continued, if possible, until the load is substantially balanced over the axle 11, after which such anchorage of the load as may be necessary or required is made. In this pull the portion 45-A of the chain leads over the sleeve 46 and bolt 45, which forms a guide and stop for the implement hitch 45 which is subsequently anchored thereto.

After loading the chain is disconnected from the traction means and the ends of the chain are preferably wrapped around the tongue to support them. The tongue is coupled to the traction means and the load is transported to desired location.

In accomplishing the loading, should the rear end anchorage effected by the ends of the beams and the cross beam 21 be insufficient, it is obvious that the wheels 13 may be blocked against forward or rearward movement, or both, in any suitable manner.

I claim:

1. In a trailer of platform type, including a wheel supported axle, longitudinal beams including a central beam forwardly extended to form a tongue and having traction hitch means on its forward end, and a floor supported on and secured to said beams; loading means which includes a said central beam-and-tongue which comprises a pair of parallel members spaced laterally apart to form a vertically disposed channelway extending from end to end of said beam-and-tongue, pins horizontally disposed through said members respectively adjacent the front and rear ends of said beam-and-tongue, a first grooved pulley journalled on the forward one of said pins, and a second grooved pulley journalled on the rearward one of said pins, said pulley being of diameter to bring its upper edge substantially flush with the tops of said beam members, and an elongated flexible loading member, disposed above and along said floor, over said first pulley, thence rearwardly beneath said floor in the channelway between said members, over said second pulley and forwardly beneath said axle to the forward end of said tongue, said loading member being of length to extend rearwardly of said trailer to accomplish loading hitch and forwardly of said tongue to accomplish traction hitch.

2. Loading means in accordance with claim 1, in which said beams and beam members are channels disposed with their webs vertical, and which said channels have their bottom flanges cut away immediately adjacent their respective rear ends to expose the lower edges of said webs adjacent said ends, and in which the rear ends of said channels are joined by a transversely disposed plate member of substantially one-half the depth of said webs.

3. A construction in accordance with claim 1, which includes a load-anchor comprising parallel plates secured to and extending upwardly from said members in adjacency to but rearward of said first pulley, and having respectively alined openings therethrough, and a pin adapted to be inserted at option through any alined pair of said openings.

4. In a trailer of platform type, including a wheel supported axle, longitudinal beams including a central beam forwardly extended to form a tongue portion and having traction hitch means on its forward end, and a floor supported on and secured to said beams; loading means which includes a said central beam and tongue portion which comprises a pair of parallel members, spaced laterally apart to form a vertically disposed channelway extending from end to end of said beam and tongue portion, pins horizontally disposed through said members respectively adjacent the front end of said tongue portion and rear end of said beam, a first grooved pulley journalled on the forward one of said pins and being of diameter to bring its lower edge substantially flush with the under surface of said member, and a second grooved pulley journalled on the rearward one of said pins and being of diameter to bring its upper edge substantially flush with the top of said beam member, and a chain, disposed above and along said floor, over said first pulley, thence rearwardly beneath said floor in the channelway between said members and over said second pulley and forwardly beneath said axle to the forward end of said tongue, said chain being of length to extend rearwardly of said trailer to accomplish loading hitch and forwardly of said tongue to accomplish traction hitch.

WILLIAM E. MILLER.